United States Patent [19]

Helfert et al.

[11] 4,275,244

[45] Jun. 23, 1981

[54] LINEAR POLYALKYLENE ETHER GLYCOLS OF HIGH MOLECULAR WEIGHT

[75] Inventors: Herbert Helfert, Frankenthal, Fed. Rep. of Germany; Pauls Davis, Gibraltar, Mich.

[73] Assignee: BASF Wyandotte Corporation, Wyandotte, Mich.

[21] Appl. No.: 57,229

[22] Filed: Jul. 13, 1979

Related U.S. Application Data

[63] Continuation-in-part of Ser. No. 904,798, May 11, 1978, abandoned, which is a continuation-in-part of Ser. No. 736,940, Oct. 29, 1976, abandoned.

[51] Int. Cl.³ .............................................. C07C 43/11
[52] U.S. Cl. .................................... 568/624; 568/607; 568/608; 568/609; 568/611; 568/623; 568/616; 568/619; 528/419; 528/425; 521/178; 252/316; 252/352; 252/358
[58] Field of Search ............... 568/607, 608, 609, 611, 568/616, 619, 623, 624; 528/419, 425; 521/178

[56] References Cited

U.S. PATENT DOCUMENTS

| | | | |
|---|---|---|---|
| 2,425,845 | 8/1947 | Toussaint et al. | 568/624 |
| 2,481,278 | 9/1949 | Ballard et al. | 568/623 |
| 2,839,476 | 6/1958 | DeGroote et al. | 568/624 |
| 2,839,477 | 6/1958 | DeGroote et al. | 568/624 |
| 3,036,118 | 5/1962 | Jackson et al. | 568/623 |
| 3,053,903 | 9/1962 | Holland | 568/624 |
| 3,057,892 | 10/1962 | DeGroote | 568/623 |
| 3,082,172 | 3/1963 | Temple et al. | 568/623 |
| 3,334,147 | 8/1967 | Brunnelle et al. | 568/623 |
| 3,535,307 | 10/1970 | Moss et al. | 568/624 |

OTHER PUBLICATIONS

Price, Accounts of Chemical Research, vol. 7, pp. 294-295 (1974).

*Primary Examiner*—Howard T. Mars
*Attorney, Agent, or Firm*—Andrew E. Pierce

[57] ABSTRACT

Linear polypropylene ether glycols of high molecular weight are made by reacting a linear polypropylene ether glycol of lower molecular weight first with an alkaline agent such as sodium hydroxide or other suitable base to form an alcoholate, and then coupling the alcoholate with a suitable difunctional coupling agent, such as the benzene-sulfonic acid diester of ethylene glycol or with some other suitable arylsulfonic acid diester of a $C_2$ to $C_6$ alcohol, thereby obtaining a 100 percent linear polypropylene ether glycol of a desirably higher molecular weight. Materials so produced find use in an aqueous medium as defoaming agents, thickeners, or emulsifiers, and use as protective colloids to improve the low-temperature stability of polyurethane and other latices.

2 Claims, No Drawings

LINEAR POLYALKYLENE ETHER GLYCOLS OF HIGH MOLECULAR WEIGHT

CROSS-REFERENCE TO RELATED APPLICATION

This is a continuation-in-part of pending application Ser. No. 904,798, filed May 11, 1978, now abandoned which is a continuation-in-part of application Ser. No. 736,940, filed Oct. 29, 1976, now abandoned.

BACKGROUND OF THE INVENTION

1. Field of the Invention

This invention relates to the making of polypropylene ether glycol compositions, and in particular, to the making of such compositions having a relatively high molecular weight, such as approximately 3,500 to about 100,000.

2. Description of the Prior Art

It is known that in the making of polymers containing chains of oxypropylene units by base-catalyzed oxypropylation, there is a limit to the average molecular weight which can be achieved. When the chain of oxypropylene units becomes longer than about 30 or more units, there is an increasing tendency for a "transfer" reaction to occur in place of the desired chain-growing or "propagation" reaction. The "transfer" reaction creates an allyl-alcohol entity which is relatively more reactive than the polymer, and it, or oxypropylated polymers derived from it, compete with increasing success for the available unreacted propylene oxide. See, for example, "Polyethers" by C. C. Price, *Accounts of Chemical Research*, Vol. 7, p. 294 and 295, (1974). The art has lacked a good way of making oxypropylated polyether compositions of advanced molecular weight.

It can be taken as known that the heating of esters of benzenesulfonic acid in the presence of excess alcohol yields ethers (Witmore, *Organic Chemistry*, 2nd edition, D. Van Nostrand Company, Inc., New York, 1951, p. 628). Moreover, the benzenesulfonic acid diester of ethylene glycol is known from Foldi, *Berichte*, 60, 660 (1927), but the concept of using such compound or another difunctional arylsulfonic acid ester as a coupling agent to overcome the molecular-weight limitation in the making of polymers containing chains of oxypropylene units is believed to be novel.

For some purposes, it is particularly desirable to obtain a composition which is substantially 100% polyether polyol; unlike materials containing ester linkages, such materials are not subject to being degraded by hydrolysis when they are present in a strongly acidic or strongly basic aqueous medium. For such uses, it is not possible to obtain a still-higher molecular weight by the use of a difunctional carboxylic acid as a coupling agent, since such an acid will ordinarily yield ester linkages.

SUMMARY OF THE INVENTION

In accordance with the invention, a method satisfying the long-felt need of the prior art is provided by the use of a suitable difunctional coupling agent such as the benzenesulfonic acid diester of ethylene glycol, or another arylsulfonic diester of an aliphatic or alkyl aromatic diol containing 2 to 6 carbon atoms in the alkyl group, such as the benzenesulfonic acid diester of triethylene glycol. Such a difunctional coupling agent reacts, under relatively mild conditions, with the alcoholate of a linear polypropylene ether glycol to form a 100% linear polypropylene ether glycol of high molecular weight. Depending upon the glycol selected, its degree of polymerization, and the extent of coupling effected, a variety of products of high molecular weight, rangeing from water-soluble materials through various gels and gums and into resinous solids, may be readily produced.

DESCRIPTION OF THE PREFERRED EMBODIMENTS

In the practice of the present invention, one starts with a polyalkylene ether glycol of a relatively modest molecular weight, usually up to about 2,000, although the invention may also be used with materials of still greater molecular weight. As those skilled in the art will readily understand, this may be any of a number of different kinds of polyalkylene ether glycol. A polyoxypropylene glycol having a molecular weight of approximately 700, 1,000, or 2,000 may be used. Another possibility is the use of a block copolymer of ethylene oxide and propylene oxide, having a central oxyethylene-unit block which is capped on its ends with units of propylene oxide and having an overall average molecular weight of 8,350 and an average molecular weight of poly(oxypropylene) hydrophobe of 1,750, such as the material sold by BASF Wyandotte Corporation, Wyandotte, Mich., as "Pluronic F-68" polyol. Various block copolymers of ethylene oxide and propylene oxide similarly can be employed.

In accordance with the present invention, a polyalkylene ether glycol with high molecular weight is made having a molecular weight of about 3,500 to about 100,000. The process of the invention overcomes the difficulty, in respect to the making of alkaline-catalyzed propylene oxide polymers, posed by the limitation in the achievable molecular weight that exists because, at some molecular weight such as approximately 2,500, there is a greater tendency for propylene oxide to react in a "transfer" mode rather than a "propagation" mode as indicated in the cited Prior Art reference to Price. The invention is practiced by reacting a starting material polyalkylene ether glycol of considerable molecular weight and containing a long, linear oxypropylene chain with an alkaline agent to form an alcoholate, and then reacting the alcoholate with a difunctional coupling agent. In particular, in accordance with the invention, there is used as such a difunctional coupling agent a diester of an aliphatic or alkylaromatic diol containing 2 to 6 carbon atoms in the alkyl group which has been reacted with an arylsulfonic acid.

The polyalkylene ether glycol of high molecular weight, can be, for example, a polyoxypropylene glycol having a molecular weight of approximately 1,000. It can also be a block copolymer of ethylene oxide and propylene oxide having a typical molecular weight of its poly(oxypropylene) hydrophobe of 1,750 and about 80% of polyoxyethylene hydrophile in the total molecule as the central portion thereof.

The alkaline agent of the invention which is used to form the alcoholate of the starting polyalkylene ether glycol is an alkali metal, i.e., lithium, sodium, or potassium or the hydroxide or inorganic weak acid salt thereof, said salt being formed by reacting a weak inorganic acid such as carbonic acid or any organic or inorganic weak acid having a dissociation constant of less than $10^{-8}$. Sodium hydroxide is preferred because of its ready availability and low cost, but it is also possible to use sodium metal or potassium metal.

The alkaline agent of the invention also can be an alkali metal alkyl having 1 to about 8 carbon atoms formed by the reaction of RMe with ROH where Me is an alkali metal and R is an alkyl group having 1 to about 8 carbon atoms. Examples of useful alkali metal alkyls are as follows: $C_5H_{11}Na$, $C_6H_5Na$, and

Alakli metal alkoxides are also useful alkaline agents. These are derived from alcohols having 1 to 5 carbon atoms such as methanol, ethanol, propanols (primary, secondary, tertiary), butanols and pentanols. Useful examples are sodium ethoxide and potassium propoxide. Alkali metal amides are also useful as the alkaline agents of the invention. These are obtained by reacting an alkali metal with ammonia or a primary, secondary or tertiary amine. Useful examples are sodium amide, potassium amide, and lithium amide. The alkaline agent is usually used in some excess of the stoichiometric amount, and the reaction mixture is rendered anhydrous, usually by azeotropic removal of water and solvent, before proceeding with the coupling reaction.

The coupling agent used is conventionally prepared by procedures known in the prior art and, as aforesaid, a diester of an alphatic or alkylaromatic diol containing 2 to 6 carbon atoms in the alkyl group and an arylsulfonic acid, such as p-toluene sulfonic acid or benzenesulfonic acid.

The diol can be an alkyl diol or a polyoxyalkylene diol. The diol or polyoxyalkylene glycol used in preparing the coupling agents of the invention can be a poly(alkylene) glycol) having the generalized formula:

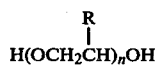

and wherein n is an integer of from 1 to 3, or a poly(methylene glycol) having the generalized formula:

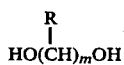

wherein m is an integer of from 2 to 6 and R is hydrogen, methyl, ethyl, phenyl or glycidol ($-CH_2-O-R'$) in which R' is phenyl, butenyl, or mixtures thereof.

Examples of useful polyoxyalkylene glycols are the polyethylene, polypropylene and polyethylene-polypropylene glycols which include diethylene, triethylene, tetraethylene, pentaethylene, hexaethylene, dipropylene glycols and mixtures thereof. Preferably, the poly(oxyalkylene glycol) is selected from the group consisting of diethylene glycol, triethylene glycol and mixtures thereof.

The diol component of the polyether of the invention can consist of aliphatic, cycloaliphatic and alkylaromatic glycols. Examples of useful diols (glycols) include ethylene glycol; propylene glycol; 1,3-propanediol; neopentyl glycol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; 1,2-cyclohexanedimethanol; 1,3-cyclohexanedimethanol; 1,4-cyclohexanedimethanol; 2,2,4,4-tetramethyl-1,3-cyclobutanediol; hydroquinone ethoxylated with 5 moles of ethylene oxide; hydroquinone propoxylated with 10 moles of propylene oxide; and 2,2-bis[4-(2-hydroxyethoxy)phenyl]propane. Preferably, the poly(methylene glycol) is selected from the group consisting of ethylene glycol, propylene glycol and 1,4-butanediol.

The benzenesulfonic acid diester of ethylene glycol is one coupling agent which can be used. The diester which results from the reaction of two moles of benzenesulfonic acid with triethylene glycol can be used. A benzenesulfonic acid or p-toluenesulfonic acid diester of 1,2-propylene glycol can similarly be used. In all of these cases, it is to be expected that an alkali-metal salt of benzenesulfonic acid or toluenesulfonic acid will be formed and split out, leaving a skeleton of the aliphatic or alkylaromatic diol involved as a link between one molecule of oxyalkylated material and another. Inasmuch as reactions which will cause the arylsulfonic acid salt to be split out can be conducted under conditions which are relatively mild, this affords a convenient way of coupling and thus further increasing the molecular weight of oxyalkylated materials which are already of considerable molecular weight.

In order to have a reaction mixture which remains capable of being handled, it is desirable to have the polyoxyalkylene glycol suspended, when the coupling agent is added, in a suitable solvent, such as benzene, toluene, or xylene. It is appropriate to use a weight of solvent equal to 1 to 5 times the weight of the polyoxyalkylene glycol to be coupled. It is usual, moreover, to have the coupling agent itself dissolved in a similar suitable solvent, having a weight in the range of 0.5 to 20 times the weight of the coupling agent employed.

The proportion of coupling agent employed can also be varied considerably. Although, in theory, it is sometimes possible to obtain satisfactory results with the use of as little as one half mol of coupling agent per mol of oxyalkylated starting material, it is usually desirable, in practice, to employ a slightly greater relative proportion of coupling agent, such as 0.8 to 1.1 mol of coupling agent per mol of oxyalkylated glycol starting material. The reaction time can sometimes be as little as about 30 minutes and sometimes as long as 5 hours; usually it is possible to use a reaction time of 1 to 3 hours. The coupling reaction takes place at, for example, about 30° to 110° C. at a pressure of 1 to about 5 atmospheres. Those skilled in the art will appreciate how, in some circumstances, temperatures or pressures higher or lower may be employed, as desired.

When the invention is practiced, there results a material containing only polyether linkages and having a high molecular weight generally of about 3,500 to about 100,000 preferably about 3,500 to about 50,000, and most preferably about 6,000 to about 30,000. The structure contains only ether linkages, and not ester or acetal linkages of the kind which are subject to attack or degradation by strongly alkaline or acidic media.

The products made according to the invention find use in aqueous media as defoaming agents, thickeners, or emulsifiers. They can also find use as protective colloids, being incorporated in polyurethane or other latices to improve the low-temperature stability thereof (prevent unwanted coagulation upon freezing).

In terms of the compositions obtained by the method explained above, the invention can be expressed as composition of matter of the structural formula $$X-(Y-X)_n-Y-X$$

wherein X is the residue of a polyether polyalkylene ether glycol of linear character and a molecular weight of up to about 2,000, upon removal of a terminal —OH group therein, Y is the residue of a diol containing 2 to 6 carbon atoms upon removal of two —OH groups therefrom, and n is such that the molecular weight of the molecule is 3,500 to about 100,000.

In the examples which follow, Examples 1 and 2 represent the case wherein said glycol is polyoxypropylene glycol of about 1,000 molecular weight, said diol is triethylene glycol, and n is 2. Example 3 represents a case wherein said glycol is a block copolymer of ethylene oxide and propylene oxide having an average molecular weight for its polyoxypropylene hydrophobe of 1,750, and having about 80% of poly(oxyethylene) hydrophile in the total molecule as the central portion thereof, said diol is triethylene glycol, and n is 2.

The invention described above is further illustrated by the following specific examples, in which all parts, percentages, and proportions are by weight and all temperatures are in degrees centigrade unless otherwise indicated. The examples are to be interpreted as illustrative only and not in a limiting sense.

EXAMPLE I

To a one-liter, four-necked flask provided with stirrer, nitrogen inlet, condenser, and azeotropic collector, there was added 9.20 grams (0.1 mol) of polypropylene ether glycol having a molecular weight of 1,000, 400 milliliters of xylene, and 25.2 grams (about 0.6 mol) of sodium hydroxide dissolved in 25 grams of distilled water. The mixture was heated to a reflux temperature at atmospheric pressure under a blanket of nitrogen, with stirring, and it was held under such conditions for 23 hours to remove all the water as in azeotrope, leaving a colorless reaction mixture.

The colorless reaction mixture was cooled under a nitrogen atmosphere to 20° C., then 40.0 grams (approximately 0.09 mol) of the dibenzenesulfonic acid diester of triethylene glycol, dissolved in 100 milliliters of dry benzene, were added all at once. The temperature of the reaction mixture rose to about 40° C., because the coupling reaction is mildly exothermic. The reaction mixture was stirred at 30° to 40° C. for one hour and later reacted further for one half hour at 80° to 105° C. to complete the reaction.

The warm reaction mixture was filtered over exceptionally pure diatomaceous silica, affording a clear, slightly yellow solution, from which solvent was subsequently evaporated by vacuum distillation, leaving as a product a yellow, viscous oil in a yield of 74 grams. The product exhibited a pH of approximately 7.

The infrared spectra of the starting material and the product were obtained and studied; they revealed a dramatic decline in the number of hydroxyl groups present. Other properties of the starting material and the product are compared in the following table.

| Property | Starting Material | Product |
|---|---|---|
| Hydroxyl Number | 129 | 13 |
| Cloud Point of 1% Solution | 33° C. | 13° C. |
| Gardner Viscosity | about 124 Centistokes | over 1,300 Centistokes |
| Molecular Wt. (by ebulliometry) | 950 | 4,000 |

EXAMPLE II

To a two-liter, round-bottom, four-necked flask provided with a mechanical stirrer, nitrogen inlet, condenser, and azeotropic collector, there was added 200.0 grams (approximately 0.2 mol) of polypropylene ether glycol having a molecular weight of approximately 1,000, dissolved in 700 milliliters of xylene. Then, the contents of the flask were refluxed at atmospheric pressure under a nitrogen blanket with stirring, to remove traces of water. Then, 9.2 grams (0.4mol) of sodium metal were added in small portions over a period of 30 minutes and permitted to react for about 6 hours at a reflux temperature. The contents of the flask were cooled to room temperature under a nitrogen blanket. Within one minute, there were added 85.0 grams (approximately 0.2 mol) of dibenzenesulfotriethylene glycol ester, dissolved in about an equal volume of dry toluene. The temperature of the reaction mixture rose from 23° C. to 43° C., with the formation of sodium benzenesulfonate. For another hour, the reaction mixture was stirred at approximately 40° C., and then for two hours at about 110° C., to complete the condensation reaction.

The reaction mixture was filtered over pure diatomaceous silica, yielding a clear, slightly yellow solution. After the evaporation of the solvent by vacuum distillation, there remained as a product a neutral, yellow viscous oil.

A comparison of the properties of the starting material and the product is shown in the following table.

| Property | Starting Material | Product |
|---|---|---|
| Hydroxyl Number | 129 | 15 |
| Cloud Point of 1% Solution | 33° C. | 13 to 14° C. |
| Gardner Viscosity | about 125 Centistokes | about 1,500 Centistokes |
| Molecular Wt. (by gel permeation chromatography), 50% | 825 | 4,280 |

EXAMPLE III

To a two-liter, round-bottom, four-necked flask provided with mechanical stirrer, nitrogen inlet, condenser, and azeotropic collector, there were added first a solution of 420 grams (0.068 mol) of surfactant as defined hereinbelow in 750 milliliters of xylene, and then a solution of 12.0 grams (0.286 mol) of sodium hydroxide and 20 grams of distilled water. The surfactant was a block copolymer of ethylene oxide and propylene oxide having an average molecular weight for its polypropylene ether hydrophobe of 1,750, and having about 80% of poly(ethylene ether) hydrophile in the total molecule as the central portion thereof. Such surfactant is sold by BASF Wyandotte Corporation, Wyandotte, Mich., under the designation "Pluronic F-68" polyol.

The reaction mixture was heated at atmospheric pressure under a nitrogen blanket and with stirring to a reflux temperature and kept at reflux temperature for 24 hours.

Dibenzenesulfotriethylene glycol ester, 33.4 grams (0.078 mol), dissolved in about an equal volume of dry benzene, was added slowly at 80° to 90° C., and the reaction mixture was kept at 80° to 90° C. for about two hours. Then the solvent was removed in a vacuum oven at about 115° C. in a period of two to three hours, and a white, solid product was thus produced.

A comparison of the properties of the starting material and the product is shown in the following table.

| Property | Starting Material | Product |
|---|---|---|
| Molecular Wt. (by gel permeation chromatography, median value) | 6,200 | 25,100 |
| Brookfield Viscosity, 5% Solution in water, Spindle No. 2, 20 rpm., 20° C. | 6 Centipoises | 16 Centipoises |
| Relative Viscosity, $\eta_R$, 5% Solution in water, Tube 300, 20° C. | 9.2 Seconds | 31.8 Seconds |

In the relative-viscosity test, water gave a value of 5.4 seconds.

While we have described herein certain embodiments of our invention, we intend to cover as well any change or modification therein which may be made without departing from its spirit and scope.

The embodiments of the invention in which an exclusive property or privilege is claimed are defined as follows:

1. A composition of matter of the structural formula:

$$X-(Y-X)_n-Y-X$$

wherein X is the residue of a polypropylene ether glycol of linear character and of a molecular weight of up to about 2,000, upon removal of a terminal —OH group therein, Y is the residue of an aliphatic or alkylaromatic diol upon removal of two —OH groups there from, having the generalized formula:

$$H(OCH_2\overset{R}{\underset{|}{C}H})_nOH$$

wherein n is an integer of from 1 to 3, or a poly(methylene glycol) having the generalized formula:

$$HO(\overset{R}{\underset{|}{C}H})_mOH$$

wherein m is an integer of from 2 to 6 and R is hydrogen, methyl, ethyl, phenyl or glycidol (—CH$_2$—O—R′) in which R′ is phenyl, butenyl, or mixtures thereof, n is such that the molecular weight of the molecule is about 3,500 to about 100,000.

2. A composition as defined in claim 1, wherein said glycol is polypropylene ether glycol of about 1,000 molecular weight, said diol is triethylene glycol, and n is 2.

* * * * *